(12) United States Patent
Baumgarte et al.

(10) Patent No.: US 10,562,220 B2
(45) Date of Patent: Feb. 18, 2020

(54) METHOD AND APPARATUS FOR DRYING BLOW MINDS ARRANGED ON A ROTATING BLOWING WHEEL TO AVOID THE FORMATION OF CONDENSATION

(71) Applicant: KHS CORPOPLAST GmbH, Hamburg (DE)

(72) Inventors: Rolf Baumgarte, Ahrensburg (DE); Michael Linke, Hamburg (DE)

(73) Assignee: KHS Corpoplast GmbH, Hamburg (DE)

(*) Notice: Subject to any disclaimer, the term of this patent is extended or adjusted under 35 U.S.C. 154(b) by 0 days.

(21) Appl. No.: 16/301,398

(22) PCT Filed: Feb. 20, 2018

(86) PCT No.: PCT/EP2018/054070
§ 371 (c)(1),
(2) Date: Nov. 13, 2018

(87) PCT Pub. No.: WO2018/150036
PCT Pub. Date: Aug. 23, 2018

(65) Prior Publication Data
US 2019/0358888 A1  Nov. 28, 2019

(30) Foreign Application Priority Data
Feb. 20, 2017 (DE) .................. 10 2017 103 438

(51) Int. Cl.
*B29C 49/46* (2006.01)
*B29C 49/36* (2006.01)
*B29C 49/62* (2006.01)
*B29C 49/66* (2006.01)

(52) U.S. Cl.
CPC .............. *B29C 49/46* (2013.01); *B29C 49/36* (2013.01); *B29C 49/62* (2013.01); *B29C 2049/4676* (2013.01); *B29C 2049/6692* (2013.01); *B29K 2023/06* (2013.01)

(58) Field of Classification Search
None
See application file for complete search history.

(56) References Cited

U.S. PATENT DOCUMENTS

| | | |
|---|---|---|
| 3,937,609 A | 2/1976 | Ryder |
| 4,076,071 A | 2/1978 | Rosenkranz et al. |
| 5,346,386 A | 9/1994 | Albrecht et al. |
| 5,648,026 A | 7/1997 | Weiss |
| 9,149,972 B2 | 10/2015 | Neubauer et al. |

(Continued)

FOREIGN PATENT DOCUMENTS

| | | |
|---|---|---|
| DE | 2352926 A1 | 4/1975 |
| DE | 4212583 A1 | 10/1993 |

(Continued)

*Primary Examiner* — Monica A Huson
(74) *Attorney, Agent, or Firm* — Rankin, Hill & Clark LLP (57) ABSTRACT

The invention relates to a method and to an apparatus for applying dry air to a blow mold (4) arranged on a rotating blowing wheel of a blowing station (3) for blow molding containers (2) from thermoplastic, wherein dry air is collected in a collecting container (39) arranged to be offset radially inward with respect to the blow mold (4) on the blowing wheel (25), and the dry air from the collecting container (39) is discharged and directed to a surface of the blow mold (4) with a directional component pointing radially outward relative to the blowing wheel.

20 Claims, 5 Drawing Sheets

(56) References Cited

U.S. PATENT DOCUMENTS

2012/0326360 A1   12/2012  Geltinger et al.
2014/0110876 A1    4/2014  Braun et al.

FOREIGN PATENT DOCUMENTS

| | | |
|---|---|---|
| DE | 4340291 A1 | 6/1995 |
| EP | 1647391 A1 | 4/2006 |
| EP | 2537663 A2 | 12/2012 |
| EP | 2722151 A1 | 4/2014 |

METHOD AND APPARATUS FOR DRYING BLOW MINDS ARRANGED ON A ROTATING BLOWING WHEEL TO AVOID THE FORMATION OF CONDENSATION

The invention relates to a method for applying dry air to a blow mold arranged on a rotating blowing wheel according to the preamble of claim 1 and an apparatus for blow molded containers of a thermoplastic material according to the preamble of claim 8.

In molding containers by the action of blowing pressure, preforms made of a thermoplastic material, for example, preforms made of PET (polyethylene terephthalate), are supplied to different processing stations in a blow molding machine, i.e., an apparatus for production of finished blow molded containers from preforms. Such a blow molding machine will typically have a heating device as well as a blowing device, in the area of which the preform regulated at a certain temperature previously in the heating device is expanded to form a container by biaxial orientation. The expansion is accomplished with the help of compressed air, for example, which is introduced into the preform to be expanded. The process engineering sequence in such expansion of a preform is explained in the document DE 43 40 291 A1, for example.

The introduction of the gas under pressure also includes introduction of compressed gas into the developing container bubble and the introduction of compressed gas into the preform at the start of the blow molding process.

The basic design of a blow molding station for container molding is described in the document DE 42 12 583 A1, for example. Possibilities for thermal conditioning of preforms are explained in DE 23 52 926 A1. Reference is made explicitly to the publications cited above, and no further description of blow molding stations or temperature conditioning is necessary to this extent.

For expansion of the thermally regulated preforms in the area of the blow molding apparatus, the preforms are blow molded while being held in a blow mold that maps the negative profile of the container to be produced. To this end, the blowing fluid is introduced under pressure into the interior of the preform held in the blow mold, so that the wall regions of the preform are in contact with the internal contour of the blow mold.

A substantial portion of the thermal energy of the preform is emitted to the blow mold during blow molding. The blow mold then heats up greatly in the process and must cool down before the next use in order to prevent it from sticking to the container wall. Cooling ensures a greater temperature difference between the preform and the blow mold, which not only reduces the risk of sticking but also supports the process of curing of the container wall of the completely blow molded container. Furthermore, shrinkage of the container after being removed from the blow mold is reduced due to rapid curing of the container on coming in contact with the cooled interior wall of the blow mold.

To increase throughput in blow molding the preforms, the blow molds are usually cooled actively. The required cooling times can be shortened in this way. Active cooling takes place, for example, with a cooling fluid, which is used as a heat exchanger and is passed through the cooling ducts in the blow mold.

A blow mold typically consists of two blow mold halves and one bottom mold, wherein the blow mold halves usually define the side and shoulder contours of the container, and the bottom mold is provided for shaping the container bottom, which is usually designed with feet. The bottom mold in particular must be cooled to a great extent because the container bottom has a relatively large amount of material in comparison with the other regions of the container and therefore has a high storage capacity for thermal energy.

Cooling fluids, typically at a cooling temperature of 10° C., are used for cooling the blow mold. The cooled blow mold parts are therefore cooled to a temperature below the dew point of ambient air under normal conditions. As a result, there is a risk of water condensing on the surfaces of the blow mold parts, in particular under moist atmospheric conditions, for example, in tropical regions, and this can result in corrosion and development of deposits.

To prevent condensation from forming on the blow mold parts, it is known from the prior art that humid ambient air can be dried with the help of a dry air fan and discharged through nozzle arrangements provided externally to the blowing wheel. Such dry air devices are installed in stationary positions outside of the rotating region of the blowing wheel and supply dry air to a line system which is arranged in a stationary position outside the blowing wheel and with which the dry air curtain is created in the area of the blowing wheel. However, such dry air curtains created externally to the blowing wheel often do not cover the entire area of the blowing wheel, and therefore there is a risk that moist air might reach sensitive regions of the blowing wheel despite the dry air curtain.

It is known from EP 1 647 391 A1 that in the case of a blowing wheel having a plurality of blow molding stations arranged thereon and spaced a distance apart from one another peripherally, the spent blowing air is discharged radially out of the blow molding stations and into the internal region of the blowing wheel. In doing so, the discharge takes place into an interior space of the blowing wheel, which is arranged at a height below that of the blow molds. The spent blowing air collected in this space then flows out of a vessel that is open at the top and along the blow molding stations in an undirected manner, so that this spent blowing air flows around the blow molding stations. This reduces the corrosion tendency due to the development of condensation.

The object of the present invention is to provide a method and an apparatus of the type defined in the introduction, which will allow improved moisture protection for the blow molds.

This object is achieved by a method having the features of claim 1 and by an apparatus having the features of claim 8. Advantageous embodiments are defined in the dependent claims.

According to the invention, the method for applying dry air to a blow mold in a blow molding station arranged on a rotating blowing wheel for blow molding of containers of a thermoplastic material, in which dry air is collected in a collecting container arranged so that it is offset radially inward on the blowing wheel and therefore is offset radially with respect to the blow mold, and the dry air is discharged out of the collecting container, so that it is directed at a surface of the blow mold with a direction component and radially outward with respect to the blowing wheel.

The idea on which the invention is based is to provide a dry air curtain on the parts of the blow mold by using dry air that is available anyway on the rotating blowing wheel Traditional, dry air curtains generated externally act by creating a wall of dry air that passively prevents moist air from penetrating. However, the method according to the invention of providing and applying dry air in a targeted manner to the blow mold parts from the inside of the blow molding stations radially to the outside radially, actively displacing the humid air out of the central region, which thus results in improved protection of the blow molding stations and other parts of the blowing wheel.

In contrast with EP 1 647 391 A1, the discharge of dry air out of the collecting container takes place radially toward the outside according to the present invention, whereas in the aforementioned prior art, the discharge is radially to the inside. In addition, there is targeted dispensing dry air onto a surface of the blow mold, whereas in the prior art, the dry air is passed by the blow molding stations without any directional guidance.

The dry air is understood in particular to be a gas that has been dried in comparison with the ambient air. Various methods are known for producing dry air. In most cases, a gas is passed through a region filled with a desiccant, which thereby achieves the desired degree of drying. The dew point of a gas can be regarded as a characteristic variable for the absolute water content of the dry air. The dew point of dry air may be in a range between minus 30° and minus 60° C., for example.

The actively cooled regions of the blow mold are particularly susceptible to condensation of water because of the great temperature differences between the surface and the surroundings. Since the bottom mold is usually cooled to a particularly great extent, the risk of condensation of water is particularly high in this area. Therefore, the idea is to preferably discharge dry air out of the collecting container, so that it is directed radially outward onto the blow mold parts of the blow molding station, in particular onto the bottom mold, in particular while it is open. Alternatively or additionally, the dry air may also be directed at other parts of the blow molding station or the blowing wheel. This may be the electronic control system, electrical and/or pneumatic distributors, drive devices and other cooled or uncooled components, for example.

It is advantageously provided according to the invention that the collecting container has outflow openings on the outside radially, which are associated with blow molding stations with regard to their peripheral distribution and height arrangement, and out of which dry air flows in a targeted manner to the regions of the blow molding station to be treated. It is advantageously provided in particular that at least one outflow opening is selected in its circumferential and height arrangement and in its orientation, so that a targeted stream of dry air is discharged onto the bottom mold when it is open. Additionally or alternatively, similar outflow openings, whether individual openings or a plurality of openings working together, may be directed at the blow mold halves. In particular, it is advantageously provided that a plurality of outflow openings are arranged one above the other, distributed over the height of the blow mold.

To provide the most seamless possible dry air curtain in the region of the blow molding stations, it is possible to provide that the blowing gas is discharged out of the collecting container, and at the same time or in a controllable sequence, onto a plurality of blow molds in different blow molding stations arranged on the blowing wheel.

The discharge of blowing air out of the collecting container can be controlled by means of closable valves. Targeted opening and closing of the valves may take place by means of control signals from a control device on the blow molding machine. In a first conceivable variant, the idea is for the collecting container to have openings through which the dry air is discharged in the direction of the blow mold parts. The openings may be, for example, passages in the collecting container wall that are constantly open. The discharge of dry air can be controlled, i.e., carried out by controllable nozzles or valves. Alternatively or additionally, the discharge of dry air may be carried out without control, i.e., in such a way that an excess pressure resulting due to the introduction of dry air into the collecting container forces the dry air to escape through the openings.

In a preferred embodiment, the idea is for the dry air to be collected in a joint collecting container, out of which the dry air is discharged onto all of the blow molds arranged on the blowing wheel of different blow molding stations, either simultaneously or in a controllable sequence.

In this embodiment, a joint collecting container, in particular a single joint collecting container, which is equipped for supplying a dry air curtain for all blow molds carried on the blowing wheel, is provided. It is possible in particular to provide that the collecting container consists of a first co-rotating container part arranged on the blowing wheel and a second stationary container part arranged in a stationary position with respect to the blowing wheel, wherein the two container parts are connected for communication. For example, additional components that are peripheral to the blowing wheel may be arranged in the stationary part of the collecting container, which may be designed as part of a machine frame in particular, these components being protected from the influence of moisture by the internal dry air environment. In particular it is provided that the co-rotating container part and the stationary container part are in constant connection, such that gas is transferred between them, so that diffusion of dry air between these parts can take place constantly during the rotation of the blowing wheel. The two container parts thus comprise a joint volume, wherein the container parts are interconnected by an opening in a wall in particular, for example, the bottom wall of the blowing wheel.

In the design of the collecting container, comprised of a co-rotating container part and a stationary container part, the dry air can be fed, additionally or alternatively, into the stationary container part. The dry air fed therein then also reaches the co-rotating part by means of a gas transmitting connection.

It is self-evident that either a single collecting container or a plurality of collecting containers will preferably be arranged on the blowing wheel symmetrically with the axis of rotation of the blowing wheel in order to prevent any imbalance during rotation. Alternatively, counterweights or other components may also be arranged on the blowing wheel in order to achieve a symmetrical distribution of weight.

When using a single joint collecting container, it is possible to provide that the outside wall of the collecting container covers the axis of rotation of the blowing wheel and borders an interior space extending over the center of the blowing wheel. Alternatively, it is also conceivable for the collecting container to form a joint annular space extending around the center of the blowing wheel.

Another advantage of the distribution of dry air according to the invention from a collecting container arranged on the rotating blowing wheel is the simple possibility of using the blowing gas already available in this area as dry air. Accordingly, in one embodiment variant, it is possible to use the blowing gas that is provided for blow molding as the dry air.

From the beginning, a very dry gas is used as the blowing air in order to prevent unwanted moisture in the interior of the container when introducing the air into the heated preform. Due to the use of a blowing gas that is available on the blowing wheel, an additional dry air device may be designed with smaller dimensions or may be omitted completely with exclusive use of the blowing gas. Alternative or additional use of blowing gas makes use of synergy effects and can thus contribute toward a reduction in the cost of operation of the blow molding machine and a reduction in component complexity, which also lowers the cost of manufacturing the blow molding machine.

An important component of the ongoing operating costs of the industrial production of container by blow molding results from providing the required blowing gas. To reduce operating costs, for example, it is known that the blowing air used may be reused repeatedly, and spent blowing gas at a high pressure level can be supplied again to container molding at a lower pressure level. When using blowing gas for acting on the blow mold parts with a curtain of dry air, the idea is to direct the compressed blowing gas, which is available in the pneumatic line system of the blow molding station, into the same collecting container, during decompression of the container after blow molding, as the container out of which the blowing gas can then be discharged to create a dry air curtain.

A further reduction in operating costs can thus be achieved by continuing to use blowing gas already introduced into a preform for blow molding. For this purpose, the specific idea is for the collecting container to be filled with blowing gas, which is removed from a ventilation line that communicates with the interior of the completely blow molded container after the blow molding of a heated preform held inside the blow mold.

To control the supply of blowing gas, a cutoff valve that controls the line may be provided in the ventilation line; this cutoff valve is controllable mechanically by means of control cams arranged in stationary positions relative to the blowing wheel and/or controlled electrically by means of control signals of a control device of the blow molding machine.

In this blowing gas recycling, the blowing gas compressed in the finished blow molded container is not discharged to the atmosphere upstream from the opening in the blow molds, as is customary, but instead it is directed into the collecting container for drying the blow mold parts and then is used further for targeted dispensing radially outward in the direction of the blow molds.

Alternatively or additionally, the blowing gas can be taken from a blowing gas feed line which still contains compressed blowing gas during the venting of the finished blow molded container. Upstream from a cutoff valve, which is closed after blow molding is completed, the blowing gas supplied by a blowing gas feed on the blowing wheel can thus be withdrawn to fill up the collecting container with the amount of dry air required for supplying the dry air curtain. Therefore, the collecting container may also be supplied with blowing gas independently of recycling of blowing gas and independently of the venting of the finished blow molded container.

Withdrawal of blowing gas from a blowing gas feeder line, which is independent of the venting phase, is recommended, for example, when the blowing gas, which is present in the preform in compressed form after blow molding has already been used for other purposes, cannot be used for diversion into the collecting container for other technical reasons or is not sufficient to create an effective dry air curtain.

Basically, blowing gas can also be taken from the blowing gas line system to fill the collecting container upstream from the feed into a rotary distributor for supplying the blowing wheel. This is recommended in particular when blowing gas is fed into a stationary part of the collecting container, which is in a gas transmitting connection with a co-rotating container part of the collecting container.

In particular when using blowing gas, which is obtained in venting the blow molds and therefore can only be provided during the venting time, i.e., can be introduced into the collecting container only in cycles and/or surges, it is possible to provide that the collecting container is designed and equipped, so that the excess pressure developing in the collecting container space with the introduction of the blowing gas is kept at a pressure above a certain pressure level. At a persistent excess pressure of the blowing gas in the collecting container, a continuous dry air stream with reduced pulsation can be made available. For that, the outlets of the collecting container, for example, may be adjustable or made with dimensions such that the dry air introduced into the collecting container space is kept at a pressure level below the ambient pressure. Therefore, additional feeder lines, in particular those that are at a regulated pressure, may be provided for feeding compressed blowing gas out of the central blowing gas feed of the blowing wheel into the collecting container in order to increase the pressure level inside the collecting container as needed.

In further use of blowing gas introduced into the preform for blow molding, the collecting container is filled with blowing gas in surges, namely regularly during depressurization of the finished blow molded container, shortly before opening the blow mold. This can result in a pulsating discharge of blowing gas out of the collecting container. To minimize the pulsation, it is possible to provide for the collecting container to be filled with blowing gas from a plurality of blow molding stations arranged on the blowing wheel, wherein the blowing gas is withdrawn from a ventilation line communicating with the interior of the finished blow molded container after blow molding of a heated preform held in the blow mold of one of the blow molding stations.

In another embodiment, the idea is for a plurality of collecting containers or a joint collecting container to be arranged on the blowing wheel, each being associated with a group of different blow molding stations or all the blow molding stations of the blowing wheel.

Furthermore, an apparatus for blow molding of containers made of a thermoplastic material, having at least one blow molding station arranged on a rotating blowing wheel with a blow mold is inventive, wherein the blowing station has a pneumatic line system for introducing a blowing gas into a heated preform that can be inserted into the blow mold, and wherein the apparatus additionally has a collecting container arranged on the blowing wheel, so that it is offset radially to the inside relative to the blow mold, to receive drying air, and wherein the collecting container has at least one gas outlet, by means of which the dry air accommodated in the collecting container can be discharged in a targeted manner onto a surface of the blow mold with a direction component pointing radially outward.

Details of the embodiment and advantages of the apparatus according to the invention are based on explanations of the method according to the invention. To this extent, conceivable embodiments of the apparatus according to the invention will not be repeated here.

For recycling of blowing gas, the idea is for the interior of the collecting container and the interior of the finished blow molded container to be connectable, so that they communicate. This can be achieved by means of a branch line, for example, which connects a blowing gas feeder line, which is provided for blow molding, to the collecting container, wherein the branch line is preferably controlled by a controllable cutoff valve. The cutoff valve may be closed for blow molding, so that during this phase, no blowing gas is directed into the collecting container. Instead of a branch line, a direct gas transmitting connection may also be provided between the interior of the finished blow molded container and the collecting container, which is opened by means of a cutoff valve, for example, for venting the container after blow molding.

For use of a collecting container, which is suitable for applying dry air at the same time to a plurality of blow molds of different blowing stations, the idea is for the collecting container to have a plurality of gas outlets, by means of which the dry air accommodated in the collecting container can be drained off simultaneously or in a controllable sequence radially outward in the direction of the blow molds in a targeted manner or in the direction of a blow mold part of the blow molds of a plurality of blowing stations.

The most uniform possible application of dry blowing air to the blow molds with the least possible pulsation can be achieved by connecting the interior of the collecting container and the interiors of finished blow molded containers of a plurality of blowing stations so they can communicate with one another.

In a preferred embodiment, the idea is for the collecting container to be designed as a joint collecting container having a plurality of gas outlets by means of which the blowing gas accommodated in the collecting container can be discharged radially outward in the direction of the blow molds or in the direction of a blow mold part of the blow molds of all blow molding stations arranged on the blowing wheel simultaneously or in a controllable sequence.

In a preferred embodiment, the idea is for the collecting container to consist of a first co-rotating container part arranged on the blowing wheel and a second stationary container part arranged in a stationary position with respect to the blowing wheel, wherein the two container parts are connected to communicate with one another. The stationary container part may be in particular part of the machine frame which carries the blowing wheel in a rotational mount. Components of the blow molding machine such as electrical supply components, control units or the like, for example, which may be arranged in the stationary container part are also protected from moisture by the application of the dry air in the collecting container.

Additionally preferably, the idea is for a blowing gas supplied for blow molding to be used as the dry air. This supports the recycling of blowing gas, among other things, as explained above. Moreover, targeted ventilation of the preforms into the collecting container may also serve to reduce noise. Cyclical opening of a ventilation line of a blow mold creates a loud ventilation noise which is usually reduced by using a damper element to reduce the noise level in the surroundings of the blow molding machine. Ventilation noises are further reduced due to displacement of the ventilation outlet into the collecting container.

Embodiments and details of the invention are explained in greater detail below with reference to schematic figures, in which.

Figure 1:
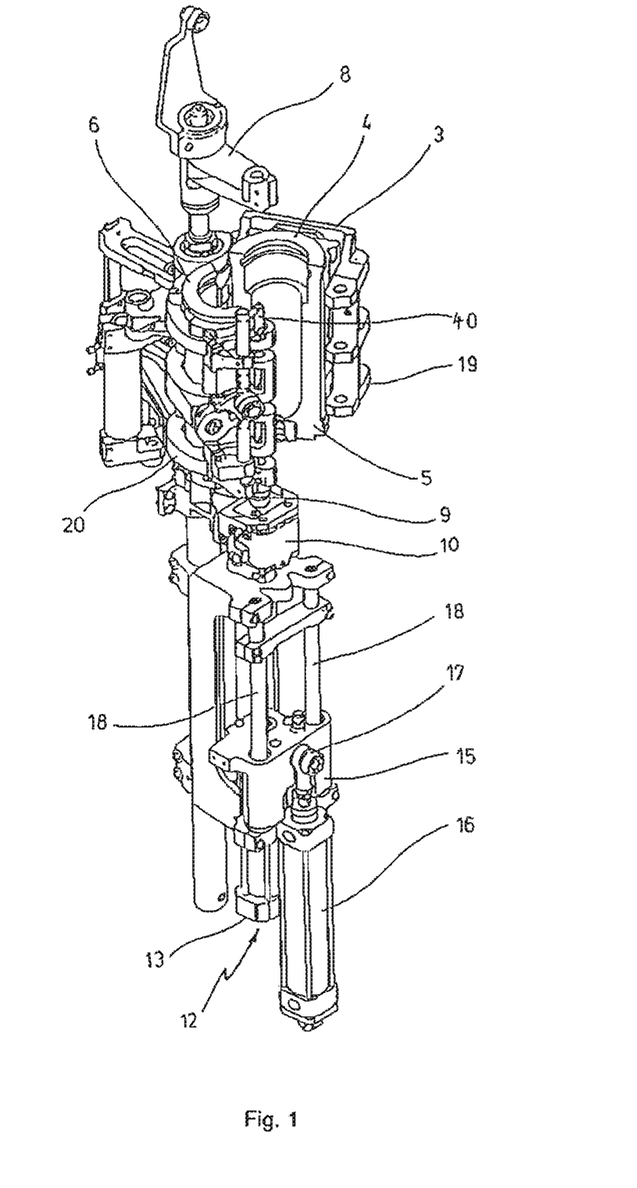
FIG. 1 shows a perspective diagram of a blowing station for production of containers from preforms.
Figure 2:
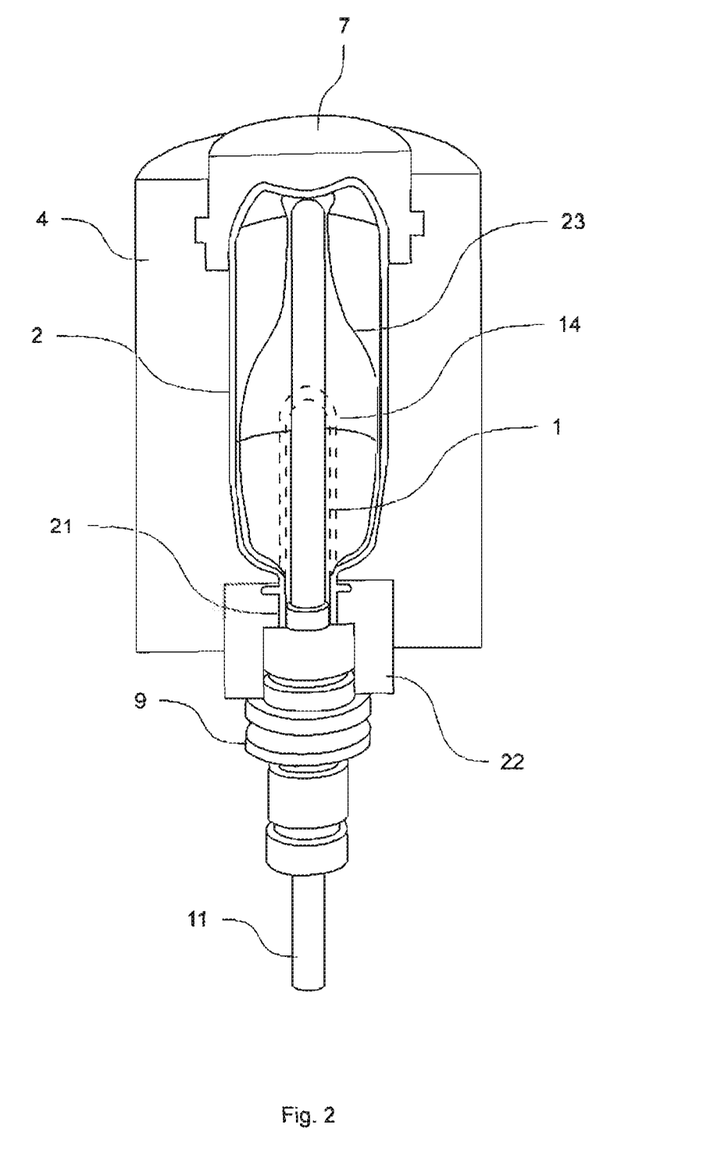
FIG. 2 shows a longitudinal section through a blow mold, in which a preform is drawn and expanded.

FIGS. 1 and 2 illustrate the basic design of an apparatus for molding preforms 1 to form containers 2. The arrangement may be like the one illustrated here or rotated by 180° in a vertical plane.

The apparatus for molding the container 2 consists essentially of a blowing station 3 provided with a blow mold 4, into which a preform 1 can be inserted. The preform 1 may be an injection molded part of polyethylene terephthalate. To enable insertion of the preform 1 into the blow mold 4 and to enable removal of the finished container 2, the blow mold 4 consists of mold halves 5, 6 and a bottom part 7, which can be positioned by means of a lifting device 8. The preform 1 can be secured by a retaining element 9 in the area of the blowing station 3. This retaining element 9 may be designed according to the invention, for example, or as is known in the prior art. For example, it is possible to insert the preform 1 directly into the blow mold 4 using tongs or other handling means. To enable a compressed air feeder line, a connecting piston 10 is arranged beneath the blow mold 4, supplying compressed air to the preform 1 and providing a seal at the same time. However, in a modified design, it is also fundamentally conceivable to use fixed compressed air feeder lines.

In this embodiment, the preform 1 is drawn with the help of a drawing rod 11, which is positioned by a cylinder 12. According to another embodiment, mechanical positioning of the drawing rod 11 is carried out by means of cam segments, which are acted upon by gripping rollers. Use of cam segments is expedient in particular when a plurality of blowing stations 3 is arranged on a rotating blowing wheel 25.

In the embodiment illustrated in FIG. 1, the drawing system is designed to provide a tandem arrangement of two cylinders 12. The drawing rod 11 is first moved into the area of a bottom 14 of the preform 1 by a primary cylinder 13 before the start of the actual drawing operation. During the actual drawing operation, the primary cylinder 13 with the extended drawing rod is positioned jointly with a carriage 15 supporting the primary cylinder 13 by a second cylinder 16 or by a cam control. In particular, the idea is to use the secondary cylinder 16 with cam control in such a way that the current drawing position is predetermined by a guide roller 17 sliding along a cam path, while the drawing operation is being carried out. The guide roller 17 is pressed by the secondary cylinder 16 against the guide path. The carriage 15 slides along two guide elements 18.

After closing the mold halves 5, 6 arranged in the area of supports 19, 20, the supports 19, 20 are locked relative to one another with the help of a locking device 40. For adaptation to different shapes of an opening section 21 of the preform 1, the use of separate threaded inserts 22 in the area of the blow mold 4 is provided according to FIG. 2.

In addition to the blow molded container 2, FIG. 2 also shows with dotted lines the preform 1 and schematically a developing container bubble 23.

Figure 3:
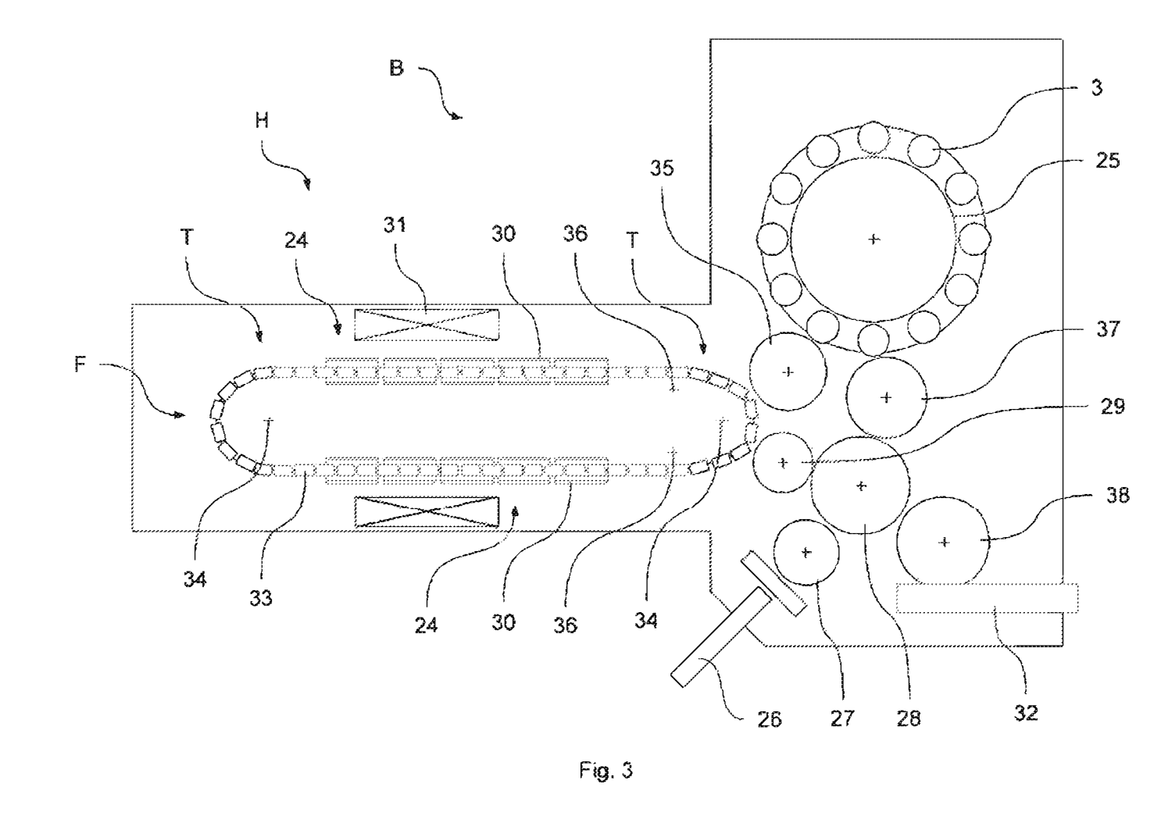
FIG. 3 shows a diagram to illustrate a basic design of an apparatus for blow molding preforms to form containers with an adjacent heating device for thermal conditioning of the preforms.

FIG. 3 shows the basic design of a blowing machine provided with a heating zone 24 and a rotating blowing wheel 25. Starting from a preform input 26, the preforms 1 are transported by the transfer wheels 27, 28, 29 into the area of the heating zone 24. Radiant heaters 30 as heating devices as well as fans 31 are arranged along the heating zone 24 in order to provide thermal regulation of the preforms 1. After adequate temperature regulation of the preforms 1, they are transferred by a transfer wheel 35 to the blowing wheel 25, in the area of which the blowing stations 3 are arranged. The finished blow molded containers 2 are sent by additional transfer wheels 37, 28, 38 to an output zone 32. The transfer wheel 37 is designed here as a removal wheel, and the transfer wheel 38 is designed as an output wheel.

To be able to mold a preform 1 to yield a container 2, such that the container 2 has material properties that ensure a long shelf-life of foods contained in the container 2, in particular beverages, special method steps must be observed in heating and orientation of the preforms 1. In addition, advantageous effects can be achieved by observing special dimensioning specifications. Various plastics may be used as the thermoplastic material. Examples of suitable materials include PET (polyethylene terephthalate), PEN (polyethylene naphthalate) or PP (polypropylene).

The preform 1 is expanded during the orientation process by supplying compressed air. The compressed air feed is subdivided into a preblowing phase, in which gas, for example, compressed air, is supplied at a low pressure level, and a subsequent main blowing phase in which gas is supplied at a higher pressure level. During the preblowing phase, compressed air at a pressure in the range of 10 bar to 25 bar is typically used, and during the main blowing phase, compressed air at a pressure in the range of 25 bar to 40 bar is supplied.

FIG. 3 also shows that in the embodiment shown here the heating zone 24 is part of the transport route of the preforms 1. The preforms 1 are transported in the heating device H by means of a plurality of revolving transport elements 33, which are arranged in a row like a chain and are guided along guide wheels 34, 36. The revolving transport elements 33 thus move along a chain path 55, which also forms the transport path of the preforms, because the preforms 1 are guided along the chain path 55. The idea in particular is to span an essentially rectangular basic contour by means of the chain-like arrangement of transport elements 33. In the embodiment illustrated here, a single guide wheel 34 of relatively large dimensions is provided in the area of the extent of the heating zone 24 facing the transfer wheel 27, and two smaller guide wheels 36 comparatively are used in the area of the neighboring deflections. Basically, however, any other guides are also conceivable.

To enable the densest possible arrangement of the transfer wheel 27 and the blowing wheel 25 relative to one another, the arrangement illustrated here has proven to be particularly advantageous because three guide wheels 34, 36 are positioned in the area of the corresponding recess in the transport path 55, namely the smaller guide wheels 36 in the area of the transfer line to the linear courses of the transport path 55, and the larger guide wheel 34 in the immediate transfer region to the transfer wheel 27 and to the blowing wheel 25. As an alternative to the use of chain-type transport elements 33, it is also possible to use a rotating heating wheel, for example.

After finished blow molding of the containers 2, they are removed from the area of the blowing stations 3 by the transfer wheel 38 and transported to the output zone 32.

Transport of the preforms 1 and the container 2 by the blowing machine B can take place in a variety of ways. According to one embodiment variant, the preforms are carried by transport mandrels at least along an essential portion of their transport path. However, it is also possible for the preforms to be transported using tongs, which grip the preform on the outside or to use internal mandrels that are inserted into a mouth area of the preform. Different variants are also conceivable with regard to the spatial orientation of the preforms.

According to one variant, the preform is oriented upward as it is supplied in the area of the preform input 26 with its mouth in a vertical direction, then rotated, conveyed along the heating zone 24 and the blowing wheel 25 with its mouth oriented downward in a vertical direction and then rotated again before reaching the output zone 32. According to another variant, the preform 2 is heated in the area of the heating zone 24 with its mouth facing downward in the vertical direction, then is rotated again by 180° before reaching the blowing wheel 25.

According to a third embodiment variant, the preform runs through the entire area of the blowing machine B with its mouth oriented upward in the vertical direction, without carrying out any turning operations.

Figure 4:
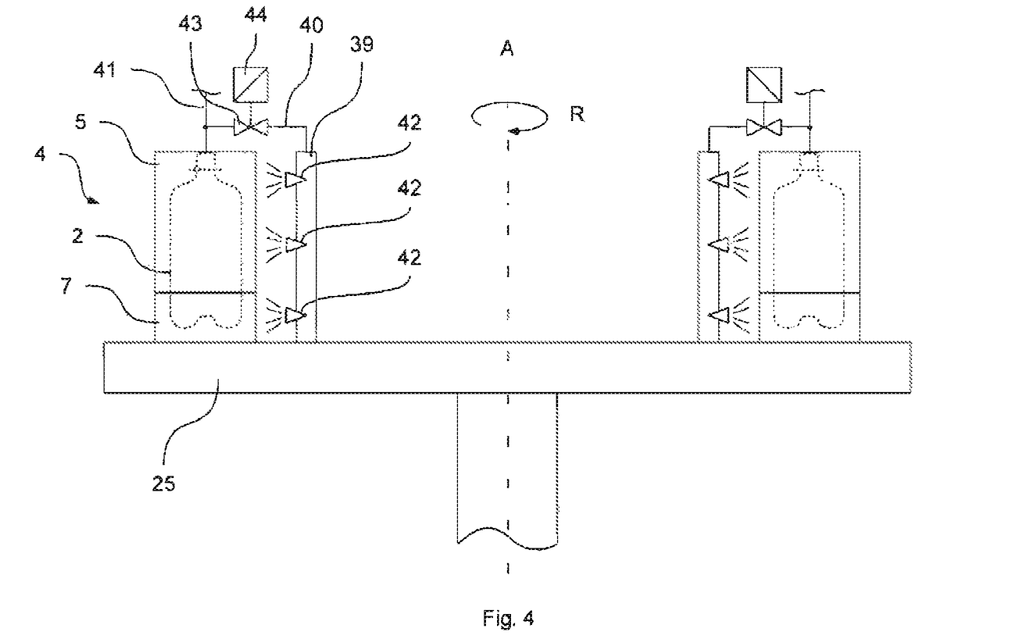
FIG. 4 shows a blowing wheel with blow molds arranged on the blowing wheel at various blowing stations with a plurality of dry air collecting containers.

FIG. 4 shows schematically an arrangement of a blow mold 4 according to the invention on a rotating blowing wheel 25, with a collecting container 39 arranged so it is offset radially toward the inside with respect to the blow mold 4. In the example shown here, two blowing stations each with one blow mold 4 are shown on the blowing wheel 25 with a collecting container 39 for forming the dry air curtain being associated with each blowing station in the area of the blow molds 4. To simplify the illustration, only two blowing stations are shown here. It is self-evident that a plurality of blowing stations may be arranged on a blowing wheel 25. Reference numerals for the same elements between the blowing stations are also used for only one blowing station in order to simplify the drawing.

Figure 5:
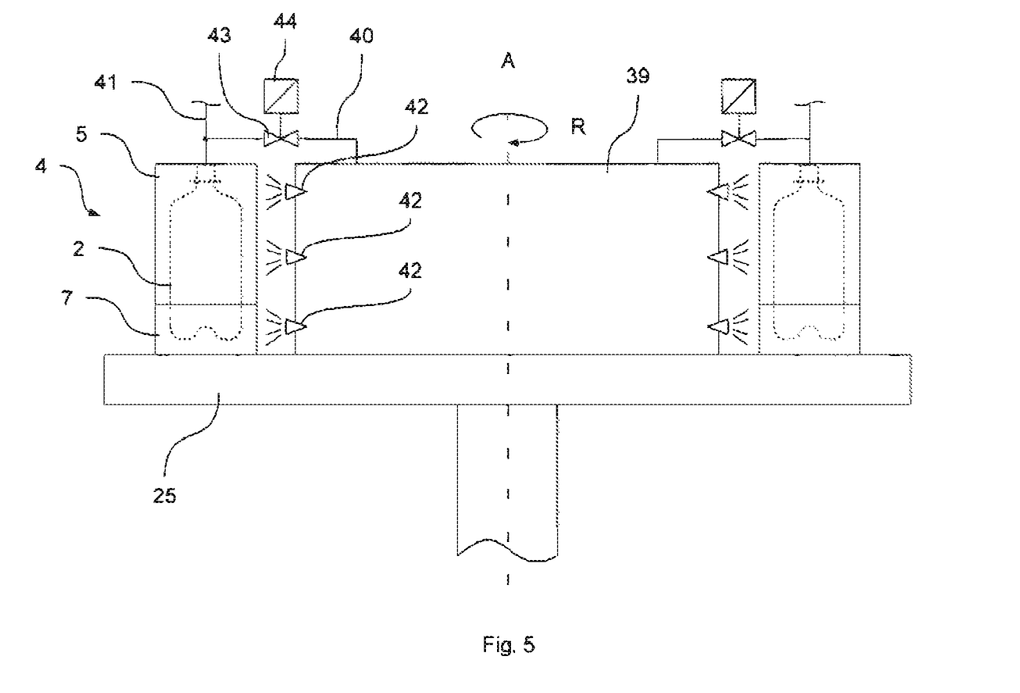
FIG. 5 shows a blowing wheel with blow molds arranged on the blowing wheel with a joint dry air collecting container.

In contrast with the example from FIG. 4, FIG. 5 shows a rotating blowing wheel 25 with a joint collecting container 39, which is provided to form the dry air curtain in the region of all the blow molds 4 arranged on the blowing wheel 25. Blowing air for this is preferably drawn from the pneumatic line systems of each blowing station and introduced into the joint interior space of the joint collecting container 39. Alternatively or additionally, the blowing air feed into the joint collecting container 39 may also take place independently of the respective pneumatic line systems of the individual blowing stations. For this purpose, the blowing air can be taken centrally from a blowing air feed, for example, which is available on the blowing wheel 25 (not shown). The same is also true of using individual collecting containers 39, each one associated with a blowing station or a group of blowing stations.

As indicated in FIG. 4, the blowing wheel 25 rotates about the axis of rotation A in the circumferential direction R. This shows in highly simplified form that the blow mold 4 encloses a finished blow molded container 2, the interior of which can be connected, so that it communicates with the interior of a collecting container 39 via a ventilation line 40. The ventilation line 40 is controlled by a cutoff valve 43, which can be opened or closed by control by means of a signal converter 44.

In the closed position of the cutoff valve 43, a compressed blowing gas supplied by a blowing gas feeder line 41 can be introduced into a preform 1 (not shown), which is held in the blow mold 4 for blow molding of the container 2, namely without any loss of blowing gas into the collecting container 39. The container is usually expanded with a blowing pressure of up to 40 bar. After blow molding of the preform 1 to form the container 2, the compressed blowing gas present in the container 2 is discharged, so that the blow mold 4 can be opened for the release and without damage to the finished blow molded container 2. For venting the container 2, the blowing gas feeder line 41 is first disconnected from a blowing gas feed (not shown) made available centrally on the blowing wheel 25, and the compressed blowing gas present in the container 2 is directed into the collecting container 39 through the ventilation line 40. The cutoff valve 43 is opened for this purpose.

The blowing gas introduced into the collecting container 39 can be blown in the direction of the blow mold 4 to create a dry air curtain in the area of the blow mold 4 by means of gas outlets 42 with a directional component pointing radially outward. As indicated, a plurality of gas outlets 42 may be provided on the collecting container 39, acting upon the different zones and/or different blow mold parts 7, 5 with blowing gas. To do so the gas outlets are distributed in height and circumference on the collecting container 39 accordingly and the direction is aimed at the zones and/or blow mold parts 7, 5 to be acted upon. In the present schematic side view, only one first mold half 5 is shown in stylized form. The second mold half 6 is covered by the first mold half 5.

The collecting container 39 is arranged on the blowing wheel 25, so that it is offset radially toward the inside with respect to the blow mold 4. The gas outlets 42 are aligned in such a way that the blowing gas can be blown out of the collecting container 39 radially outward onto the surface of the blow mold 4. The shape of the gas outlets 42 may be embodied in various ways. Nozzles inserted into the wall of the collecting container 39 are conceivable. Additionally or alternatively, it is also possible to provide that branch lines run away from the collecting container 39 in the direction of the blow mold 4, directing the blowing air introduced into the collecting container 39 into certain zones of the blow mold 4, which are cooled to a particularly great extent and require a high dry air stream to prevent condensation from forming to this extent. In particular, the bottom mold 7 is cooled to a great extent, so that a greater volume flow of drying blowing air is required on the surface of the bottom mold 7. The collecting container 39 may also be designed in particular, so that the drying blowing air is blown exclusively or mostly in the direction of the bottom mold 7 to create a dry air curtain.

The embodiment according to FIG. 5 differs from the embodiment in FIG. 4 only in that a joint collecting container 39 is provided instead of a single collecting container. In the example shown here, it is provided that, in the joint collecting container 39, the compressed blowing air of the individual blowing stations arranged on the blowing wheel 25, said blowing air being present in the pneumatic line system connected to the interior of the container 2 in ventilation of a finished blow molded container 2, so that they communicate, the air being collected in the container. The feed of blowing air into the joint collecting container 39 then takes place in cycles, namely in the sequence of the venting operations of the individual blowing stations, each of which is connected for blow molding of the container 2.

As also shown in FIG. 4, individual ventilation lines 40 from the pneumatic systems of the individual blowing stations may open into the joint collecting container 39, these ventilation lines being opened and closed in a controlled manner by means of a cutoff valve 43 during blow molding of the container 2 for ventilation of the finished blow molded container 2.

In this example, a drying air current of blowing air acts upon the blow molds 4 centrally coming from the joint collecting container 39, wherein the discharge of blowing air out of the collecting container 39 can take place at the same time or in a controlled sequence, radially toward the outside in the direction of the blow molds 4.

It is indicated in FIG. 5 that the joint collecting container 39 is designed as a housing enclosing the central space on the blowing wheel 25. It is also conceivable for the collecting container 39 to enclose an annular gap space extending in a ring around the rotational axis A of the blowing wheel 25.

Figure 6:
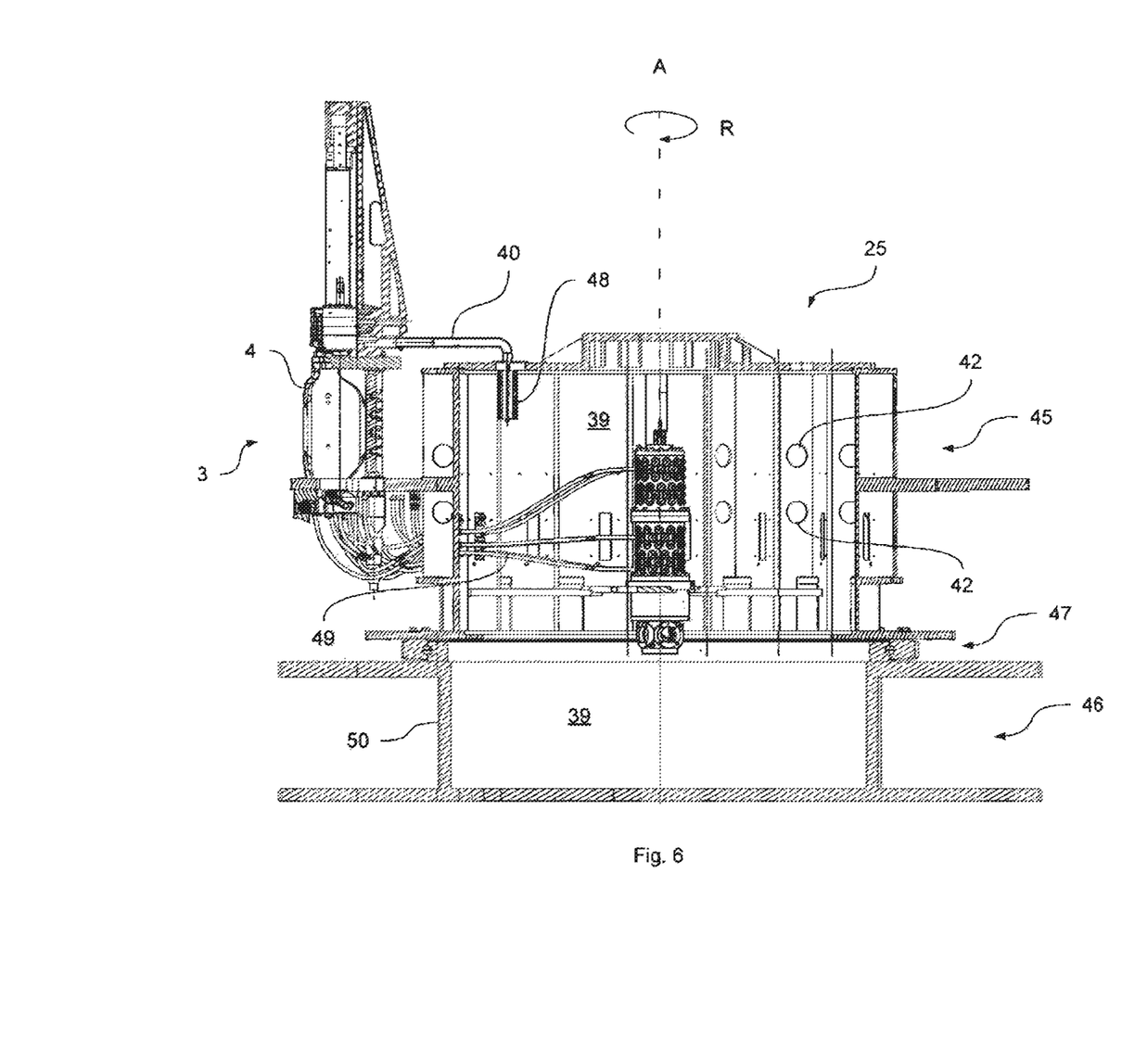
FIG. 6 shows an embodiment of a blowing wheel with a collecting container according to the invention.

FIG. 6 shows an embodiment of a blowing wheel 25 with a joint collecting container 39 consisting of a first co-rotating container part 45 and a second stationary container part 46. The spatial volume of the joint collecting container 39 is formed by the interior of the co-rotating container part 45 and the interior of the stationary container part 46.

The stationary container part 46 may be part of a machine frame 50, as in the present case, which carries the blowing wheel 25 and supports it rotationally. The rotating blowing wheel 25 is rotatably mounted on the machine frame 50 by means of a ball bearing-supported distributor 47 in the embodiment shown here. The blowing wheel 25 has an approximately cylindrical spatial area in its central area, forming the co-rotating container part 45 of the collecting container 39. The co-rotating container part 45 is connected to the stationary container part 46, so that they communicate through a passage in the bottom area of the blowing wheel 25 and there can be an exchange of air volume between the two container parts during the rotation of the blowing wheel 25.

As already explained in the embodiments in FIGS. 4 and 5, the blowing wheel 25 carries blowing stations 3 each with one blow mold 4. For reasons of simplicity, only a single blowing station 3 is shown in the present embodiment. It is self-evident that the blowing wheel 25 may have one or more blowing stations 3 arranged around its periphery in particular.

In the embodiment shown in FIG. 6, it is provided that the collecting container 39 is filled with the blowing gas used for blow molding of a container. Therefore, the interior of a container 2 (not shown) held in the blow mold 4 can be connected to the interior of the collecting tank 39, so that it communicates by means of a ventilation line 40.

In the present case, the ventilation line 40 opens into a noise damping device 48. The noise damping device 48 is designed and equipped to reduce the ventilation noises generated in venting the pressurized finish blow molded container 2, With traditional blowing wheel structures, the compressed blowing gas present in the finished blow molded container 2 is discharged through a noise damping device 48 directly into the ambient air. In the present case the compressed blowing air in the container is instead used further to form a dry air curtain. On the one hand this blowing gas recycling ensures an increase in energy efficiency of the blowing machine and on the other hand the noise level in the areas surrounding the blowing machine can be further reduced by integration of the noise damping device 48 into the interior of the collecting container 39.

The blowing gas introduced into the collecting container 39 is discharged out of the collecting container 39 in the direction of the blowing stations 3, through gas outlets 42 situated on the outside radially with a directional component aimed radially outward with respect to the axis of rotation A of the blowing wheel 25. Therefore, during rotation of the blowing wheel 25, a curtain of dry air, directed from the inside outward, is created in the area of the blowing stations 3. Due to vacuum prevailing in the collecting container 39, any penetration of moist ambient air is prevented. In the area of the blowing stations 3 on the outside radially with respect to the axis of rotation A of the blowing wheel, displacement of moist ambient air is actively pursued. In the present case the gas the gas outlets 42 are designed as passages in the side wall of the collecting container 39, in particular as passages in the co-rotating container part 45 of the collecting container 39. Through the choice of the diameter of the gas outlets 42 and/or through the use of nozzle elements on the gas outlets 42, the direction and speed of the dry air flowing out of the collecting container 39 can be influenced.

In the present embodiment, coolant lines 49 are shown in the interior of co-rotating container part 45. These coolant lines 49 and in particular the connecting parts, which are usually made of metal, between the coolant lines 49 and the central coolant distributor as well as the connecting points between the coolant lines 49 and the wall of the collecting container 39 are also cooled to a great extent by the coolant being carried and are thus also subject to the risk that water of condensation may form. Due to the dry air environment inside the collecting container 39, these coolant lines 49 as well as all other elements arranged inside the collecting container 39 are acted upon by dry air, which prevents water from condensing on cold surfaces.

Moreover, the internal area of the collecting container 39 is cooled by the expansion cold formed on the noise damping devices 50 in the impact-type release of the finished blow molded containers 2. Due to this additional cooling in the interior of the collecting container 39, both incoming and outgoing coolants lines 49 are cooled from the outside. This expansion cold, which is generated in ventilation of the finished blow molded container 2, can thus be utilized to reduce the coolant power to be expended due to the forward and reverse flows of the coolant supply.

LIST OF REFERENCE NUMERALS

1 Preform
2 Container
3 Blowing station
4 Blow mold
5 First mold half
6 Second mold half
7 Bottom part
8 Lifting device
9 Retaining element
10 Connecting plunger
11 Drawing rod
12 Cylinder
13 Primary cylinder
14 Bottom
15 Carriage
16 Secondary cylinder
17 Guide roll
18 Guide element
19 First support
20 Second support
21 Opening section
22 Threaded insert
23 Container bubble
24 Heating zone
25 Blowing wheel
26 Preform input
27 Transfer wheel
28 Transfer wheel
29 Transfer wheel
30 Radiant heater
31 Fan
32 Output zone
33 Transport means
34 Guide wheel
35 Transfer wheel
36 Guide wheel
37 Transfer wheel
38 Transfer wheel
39 Distributor
40 Ventilation line
41 Blowing gas feeder line
42 Gas outlet
43 Cutoff valve
44 Signal converter
45 Co-rotating container part
46 Stationary container part
47 Ball bearing-supported connector
48 Noise damping device
49 Coolant lines
50 Machine frame
A Rotational axis of the blowing wheel
R Direction of rotation

The invention claimed is:

1. A method for applying dry air to a blow mold of a blowing station for blow molding of a container made of thermoplastic material, said blow mold being arranged on a rotating blowing wheel, the method comprising:
    collecting dry air in a collecting container that is arranged on the blowing wheel such that, with respect to the blowing wheel, the collecting container is offset radially inward of the blow mold, and
    discharging the dry air from the collecting container onto a surface of the blow mold such that the discharged dry air has a direction component pointing radially outward with respect to the blowing wheel.

2. The method according to claim 1, wherein a plurality of blow molds are arranged on the blowing wheel, wherein a plurality of collecting containers are arranged on the blowing wheel, wherein each of the plurality of collecting containers is associated with one of the plurality of blow molds, and wherein the dry air is discharged out of the plurality of collecting containers onto the associated blow molds simultaneously or in a controllable sequence.

3. The method according to claim 1, wherein a plurality of blow molds are arranged on the blowing wheel, wherein the collecting container is a joint collecting container, and wherein the dry air is discharged from the joint collecting container onto the plurality of blow molds simultaneously or in a controllable sequence.

4. The method according to claim 1, wherein a blowing gas supplied for blow molding of the container is used as the dry air.

5. The method according to claim 4, wherein the collecting container is filled with blowing gas taken from a ventilation line that communicates with an interior of the container after the container has been formed by blow molding a heated preform held inside the blow mold.

6. The method according to claim 3, wherein a blowing gas supplied for blow molding of the container is used as the dry air, wherein the joint collecting container is filled with the blowing gas from the plurality of blowing stations arranged on the blowing wheel, wherein the blowing gas is obtained from a ventilation line that communicates with an interior of the container after the container is formed by blow molding a heated preform held inside the blow mold at one of the plurality of blowing stations.

7. The method according to claim 1, wherein the collecting container has a plurality of gas outlets facing radially outward with respect to the blowing wheel toward the blowing station, wherein the plurality of gas outlets are arranged differently with respect to peripheral distribution and height, and wherein dry air flows out of plurality of gas outlets onto the surface of the blowing station in a targeted manner.

8. The method according to claim 7, wherein at least one of the plurality of gas outlets is arranged to target a stream of dry air onto a bottom mold part when the blow mold is open, wherein some of the plurality of gas outlets are arranged to target streams of dry air onto blow mold halves when the blow mold is open.

9. The method according to claim 7, wherein some of the plurality of gas outlets are arranged one above the other to as to target streams of dry air onto and over a height of the blow mold when it is open.

10. An apparatus for blow molding of a container from a heated preform made of a thermoplastic material, said apparatus comprising:
 a blowing station with a blow mold arranged on a rotating blowing wheel, wherein the blowing station has a pneumatic line system for introducing a blowing gas into the heated preform that is insertable into the blow mold; and
 a collecting container arranged on the blowing wheel such that, with respect to the blowing wheel, the collecting container is offset radially inward of the blow mold, wherein the collecting container is configured to receive dry air, and wherein the collecting container has at least one gas outlet through which the dry air received in the collecting container is dischargeable out of the collecting container onto a surface of the blow mold such that the discharged dry air has a direction component pointing radially outward with respect to the blowing wheel.

11. The apparatus according to claim 10, further comprising a ventilation line for conveying the dry air to an interior of the collecting container from an interior of the container formed in the blow mold.

12. The apparatus according to claim 10, wherein a plurality of blow molds are arranged on the blowing wheel, wherein a plurality of collecting containers are arranged on the blowing wheel, wherein each of the plurality of collecting containers is associated with one of the plurality of blow molds, and wherein the plurality of collecting containers have a plurality of gas outlets through which the dry air received in the plurality of collecting containers is dischargeable simultaneously or in a controlled sequence toward the plurality of blow molds or toward blow mold parts of the plurality of blow molds.

13. The apparatus according to 10, further comprising a ventilation line for each collecting container for conveying the dry air to an interior of the collecting container from an interior of the container formed in the associated blow mold.

14. The apparatus according to claim 10, wherein a plurality of blow molds are arranged on the blowing wheel, wherein the collecting container is a joint collecting container having a plurality of gas outlets, and wherein the dry air received in the joint collecting container is dischargeable through the plurality of gas outlets simultaneously or in a controllable sequence toward the plurality of blow molds or toward blow mold part.

15. The apparatus according to claim 10, wherein the collecting container comprises a first container part arranged on the blowing wheel that rotates together with the blowing wheel and a second stationary container part arranged such that it is stationary with respect to and does not rotate together with the blowing wheel, and wherein the first container part and the second container part are connected so as to be in fluid communication with each other.

16. The apparatus according to claim 10, wherein the apparatus is configured such that a blowing gas provided for blow molding is conveyed to the collecting container as the dry air.

17. The apparatus according to claim 10, wherein the collecting container has a plurality of gas outlets facing radially outward with respect to the blowing wheel toward the blowing station, wherein the plurality of gas outlets are arranged differently with respect to peripheral distribution and height, and wherein dry air flows out of the plurality of gas outlets onto the surface of the blowing station in a targeted manner.

18. The apparatus according to claim 17, wherein at least one of the plurality of gas outlets is arranged to target a stream of dry air onto a bottom mold part when the blow mold is open.

19. The apparatus according to claim 17, wherein some of the plurality of gas outlets are arranged to target streams of dry air onto blow mold halves when the blow mold is open, and wherein some of the plurality of gas outlets are arranged one above the other to as to target streams of dry air onto and over a height of the blow mold when it is open.

20. A method for applying dry air to a blow mold of a blowing station for blow molding of a container made of thermoplastic material, the method comprising:
 providing an apparatus according to claim 10;
 collecting dry air in the collecting container; and
 discharging the dry air from the collecting container onto the surface of the blow mold.

* * * * *

UNITED STATES PATENT AND TRADEMARK OFFICE
CERTIFICATE OF CORRECTION

PATENT NO. : 10,562,220 B2
APPLICATION NO. : 16/301398
DATED : February 18, 2020
INVENTOR(S) : Rolf Baumgarte et al.

Page 1 of 1

It is certified that error appears in the above-identified patent and that said Letters Patent is hereby corrected as shown below:

On the Title Page

At Item (54) and the Specification at Column 1, Lines 1-4 In Title,

Change "METHOD AND APPARATUS FOR DRYING BLOW MINDS in ARRANGED ON A ROTATING BLOWING WHEEL TO AVOID THE FORMATION OF CONDENSATION" to --METHOD AND APPARATUS FOR DRYING BLOW MOLDS ARRANGED ON A ROTATING BLOWING WHEEL TO AVOID THE FORMATION OF CONDENSATION--

Signed and Sealed this
Fifth Day of May, 2020

Andrei Iancu
*Director of the United States Patent and Trademark Office*